UNITED STATES PATENT OFFICE.

CARL MANNICH, OF FRIEDENAU, AND FRANZ ZERNIK, OF STEGLITZ, NEAR BERLIN, GERMANY.

LIGHT-FILTER.

1,099,710.

Specification of Letters Patent.   Patented June 9, 1914.

Application filed July 19, 1909.   Serial No. 508,517.

No Drawing.

*To all whom it may concern:*

Be it known that we, CARL MANNICH and FRANZ ZERNIK, subjects of the German Emperor, and residing, respectively, at Friedenau and Steglitz, near Berlin, Germany, have invented certain new and useful Improvements in Light-Filters, of which the following is a specification.

Our invention relates generally to light-filters and particularly to light-filters for protecting textile fabrics, paper, oil-paintings and the like from fading, becoming yellow, and darkening, further, for protecting the human skin from becoming sunburnt, from glacial burns and from becoming freckled, and, in addition, for modifying photographic reproductions instead of using colored retouching agents.

Our light-filter has the advantage of appearing colorless or almost colorless so that articles located under it appear unchanged in color to the observer. The efficacy of the filter is due to its percentage of colorless or almost colorless coumarin derivatives which have the property of absorbing the chemically operative ultra-violet rays from the sun or similar sources of light.

A usable light-filter which can be employed in many ways must fulfil the following conditions:

1. It must be colorless or almost colorless so that the objects to be protected appear unchanged in color to the observer.

2. It must be able to absorb completely the very injurious ultra-violet rays of sunlight.

3. The operative substance employed in the light-filter must be able to be incorporated in a solution which can be readily spread on an article.

4. When such a solution becomes dry the operative substance contained in it must not be separated out. If this were the case the light-filter would frequently not adhere sufficiently to the object to be protected. Above all, in the case of the operative substance being separated out spaces permeable to the chemically operative ultra-violet rays would be produced in the light-filter.

5. The light-filter must be non-poisonous and also without any injurious influence on the object to be treated even when employed for a somewhat long time.

6. The operative substance contained in the light-filter must be readily available and able to be manufactured cheaply.

Of the substances which have been used in practice heretofore for colorless light-filters bisulfate of quinin, esculin and triphenylmethane are known best. Bisulfate of quinin is operative only in strong sulfuric solution, and the free sulfuric acid contained therein attacks the articles brought into contact with it. Bisulfate of quinin has a relatively weak power of absorption and is not very stable in light. Esculin is soluble with difficulty in neutral and acid media, its alkaline solutions soon decompose and then become dark brownish yellow in color. In addition, esculin is a natural product and only procurable in limited quantities, its price being, therefore, much too high for commercial use. Triphenylmethane is still less effective than bisulfate of quinin and has such a power of crystallizing that it almost always crystallizes out when its solution dries up.

In contradistinction to the substances mentioned above the coumarin derivatives employed by us, particularly oxycoumarins and aminocoumarins, fulfil all the above mentioned conditions. In chemical constitution coumarin derivatives are far removed from bisulfate of quinin and triphenylmethane and only in some degree connected with esculin. The coumarin derivatives employed by us have, however, as compared with esculin above all the advantage of being capable of production cheaply synthetically.

The very great efficacy of the coumarin derivatives employed by us is seen from the following tests:

1. A thin solution of indigo-carmine was illuminated in direct sunshine, in one instance behind a layer of water 1 cm. thick and in another instance behind an equally thick, colorless layer of a solution (1:10000) of β-methyl-dioxy-coumarin

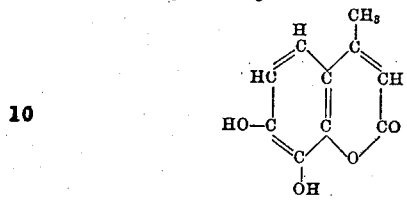

the indigo solution bleached rapidly in the first instance but—*cæteris paribus*—remained unchanged in the second instance.

2. A thin glass plate which had been coated with a 1% solution of dimethylamin-β-methylcoumarin

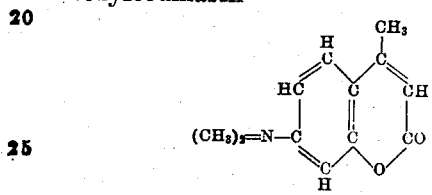

in a colorless varnish prepared with alcohol was placed on photographic copying paper beside a second plate which had been coated solely with varnish. When exposed the paper was blackened much slower under the first glass plate than under the second. The protection from light is in this case, of course, not perfect, as the photographic paper is sensitive to the visible rays which pass unimpeded through the light-filter.

3. A 15% very weak alkaline solution of β-methyl-oxy-coumarin

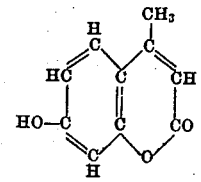

in aqueous glycerin was rubbed into the skin, and the place in question was exposed for a somewhat long time to direct sunlight. The impregnated place remained unchanged, whereas the surrounding, non-treated parts showed the well-known signs of sunburn after some time.

We do not claim the employment of esculin for our light-filters, but

We claim:

1. A light-filter composed of one or more substances containing a colorless or approximately colorless coumarin derivative, in which the hydrogen atoms are replaced by groups whose hydrogen atoms can be replaced by radicals.

2. A light-filter composed of an alkaline solution containing β-methyloxycoumarin.

In testimony whereof, we affix our signatures in the presence of two witnesses.

CARL MANNICH.
FRANZ ZERNIK.

Witnesses:
HENRY HASPER,
WOLDEMAR HAUPT.